(12) United States Patent
Hamada

(10) Patent No.: US 8,886,618 B2
(45) Date of Patent: Nov. 11, 2014

(54) DOCUMENT MANAGEMENT APPARATUS, METHOD AND MEDIUM STORING PROGRAM

(75) Inventor: Yoshinobu Hamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 290 days.

(21) Appl. No.: 12/500,470

(22) Filed: Jul. 9, 2009

(65) Prior Publication Data

US 2010/0017421 A1    Jan. 21, 2010

(30) Foreign Application Priority Data

Jul. 18, 2008   (JP) ................................ 2008-187912

(51) Int. Cl.
*G06F 17/30* (2006.01)

(52) U.S. Cl.
CPC .... *G06F 17/30011* (2013.01); *G06F 17/30221* (2013.01)
USPC ........................................................ 707/694

(58) Field of Classification Search
CPC .............................................. G06F 17/30221
USPC ........................................................ 707/694
See application file for complete search history.

(56) References Cited

U.S. PATENT DOCUMENTS

| | | | |
|---|---|---|---|
| 5,819,295 A | 10/1998 | Nakagawa et al. | |
| 6,466,941 B1 * | 10/2002 | Rowe et al. | 707/786 |
| 2003/0110106 A1 * | 6/2003 | Deshpande et al. | 705/35 |
| 2004/0056903 A1 * | 3/2004 | Sakai | 345/853 |
| 2005/0228818 A1 * | 10/2005 | Murthy et al. | 707/102 |
| 2005/0286787 A1 | 12/2005 | Yagiura et al. | |
| 2008/0282200 A1 | 11/2008 | Hamada | |
| 2008/0306900 A1 | 12/2008 | Tamura | |
| 2009/0327326 A1 * | 12/2009 | Bahr | 707/102 |

FOREIGN PATENT DOCUMENTS

| | | |
|---|---|---|
| JP | 9128380 A | 5/1997 |
| JP | 2001-75845 A | 3/2001 |
| JP | 2002082828 A | 3/2002 |
| JP | 2006-42318 A | 2/2006 |
| JP | 2006048521 A | 2/2006 |
| JP | 2008-305094 A | 12/2008 |
| JP | 2009-80643 A | 4/2009 |

OTHER PUBLICATIONS

Japanese Office Action dated Mar. 29, 2013, in counterpart Japanese Application No. 2008-187912.

* cited by examiner

*Primary Examiner* — Khanh Pham
*Assistant Examiner* — Johnese Johnson
(74) *Attorney, Agent, or Firm* — Fitzpatrick, Cella, Harper & Scinto

(57) ABSTRACT

The current position of each node in a hierarchical structure is held, and the past position of each node in the hierarchical structure is held. The current position is displayed in correspondence with the past position in a first user interface. The past position is displayed in correspondence with the current position in a second user interface. When the past position displayed in the first user interface is designated, the second user interface displays the designated past position. When a current position displayed in the second user interface is designated, the first user interface displays the designated current position.

8 Claims, 17 Drawing Sheets

FIG. 7

| ITEM ID | ITEM NAME | ITEM TYPE | PARENT ITEM ID | ITEM ENTITY | ... |
|---|---|---|---|---|---|
| 10001 | Project1 | FOLDER | 0 | | ... |
| 11000 | ESTIMATE | FOLDER | 10001 | | ... |
| 12000 | EXAMINATION | FOLDER | 10001 | | ... |
| 13000 | DEVELOPMENT | FOLDER | 10001 | | ... |
| 14000 | EVALUATION | FOLDER | 10001 | | ... |
| 15000 | REVIEW | FOLDER | 10001 | | ... |
| ... | | | ... | ... | ... |

FIG. 8

| PAST ARRANGEMENT STATE ID | ITEM ID | ARRANGEMENT STATE ACQUISITION DATE & TIME | ARRANGEMENT STATE ACQUIRER |
|---|---|---|---|
| 100 | 2055 | 2007/06/15 09 : 28 : 52 | kimura |
| 200 | 6239 | 2007/06/22 14 : 12 : 03 | kamata |
| 300 | 10001 | 2007/07/02 10 : 37 : 41 | fukuoka |
| 301 | 10001 | 2007/11/02 15 : 22 : 34 | hamada |
| ... | ... | ... | ... |

FIG. 9

| PAST ARRANGEMENT STATE ID | ITEM ID | NAME | ITEM TYPE | PARENT ITEM ID |
|---|---|---|---|---|
| 301 | 10001 | Project1 | FOLDER | 0 |
| 301 | 11000 | ESTIMATE | FOLDER | 10001 |
| 301 | 12000 | EXAMINATION | FOLDER | 10001 |
| 301 | 12016 | V1.0 REQUIREMENTS | DOCUMENT | 12000 |
| 301 | 12048 | V1.1 REQUIREMENTS | DOCUMENT | 12000 |
| 301 | 12055 | V1.2 EXAMINATION NOTE | DOCUMENT | 12000 |
| 301 | 12057 | V1.2 EXAMINATION NOTE 2 | DOCUMENT | 12000 |
| 301 | 12077 | V1.3 CONCEPT EXAMINATION MATERIALS | DOCUMENT | 12000 |
| 301 | 12084 | V1.3 REQUESTS 20060415 | DOCUMENT | 12000 |
| 301 | 12095 | REQUIREMENT REVIEW MATERIALS V1.3 | DOCUMENT | 12000 |
| 301 | 12040 | REQUIREMENT LIST 1.2_temp | DOCUMENT | 12000 |
| 301 | 12043 | V1.2 ACTION ITEM | DOCUMENT | 12000 |
| 301 | 12092 | REQUIREMENTS V1.3 | DOCUMENT | 12000 |
| 301 | 13000 | DEVELOPMENT | FOLDER | 10001 |
| 301 | 13100 | V1.3 | FOLDER | 13000 |
| 301 | 13200 | EXAMINATION | FOLDER | 13100 |
| 301 | 13212 | EXAMINATION OF NEW FUNCTIONS | DOCUMENT | 13200 |
| ... | ... | ... | ... | ... |

F I G. 10

| OPER-ATION ID | TARGET ITEM ID | OPER-ATOR | OPER-ATION NAME | OPER-ATION SOURCE ID | OPERATION SOURCE PATH | OPERATION DESTI-NATION ID | OPERATION DESTINATION PATH | NEW ITEM ID | OPERATION DATE & TIME | ... |
|---|---|---|---|---|---|---|---|---|---|---|
| 37 | 12055 | fukuoka | REGISTER | | | 12000 | /Project1/ EXAMINATION/ | | 2005/06/18 14:28:29 | ... |
| 40 | 12057 | fukuoka | REGISTER | | | 12000 | /Project1/ EXAMINATION/ | | 2005/07/10 20:31:07 | ... |
| 62 | 12043 | fukuoka | REGISTER | | | 12000 | /Project1/ EXAMINATION/ | | 2006/02/13 15:23:37 | ... |
| 114 | 12077 | fukuoka | MOVE | 12000 | /Project1/ EXAMINATION/ | 21200 | /Project1/004.V1.3/ 001.EXAMINATION/ | | 2007/11/05 13:48:05 | ... |
| 123 | 12055 | fukuoka | ACQUIRE | 12000 | /Project1/ EXAMINATION/ | | | | 2007/11/06 10:12:26 | ... |
| 135 | 12055 | fukuoka | DELETE | 12000 | /Project1/ EXAMINATION/ | | | | 2007/11/06 10:24:41 | ... |
| 143 | 12057 | hamada | COPY | 12000 | /Project1/ EXAMINATION/ | | | 16638 | 2007/11/06 10:32:24 | ... |
| 144 | 16638 | hamada | COPY (NEW) | | | 13300 | /Project1/ DEVELOPMENT/temp/ | | 2007/11/06 10:32:24 | ... |
| 156 | 12057 | fukuoka | DELETE | 12000 | /Project1/ EXAMINATION/ | | | | 2007/11/06 11:15:33 | ... |
| 159 | 12043 | fukuoka | DELETE | 12000 | /Project1/ EXAMINATION/ | | | | 2007/11/06 11:16:22 | ... |
| 178 | 21238 | kimura | REGISTER | | | 21200 | /Project1/004.V1.3/ 001.EXAMINATION/ | | 2007/11/07 08:43:52 | ... |
| 194 | 16638 | hamada | MOVE | 13300 | /Project1/ DEVELOPMENT/temp/ | 21100 | /Project1/003.V1.2/ 001.EXAMINATION/ | | 2007/11/07 09:05:16 | ... |
| ... | ... | ... | ... | ... | ... | ... | ... | ... | ... | ... |

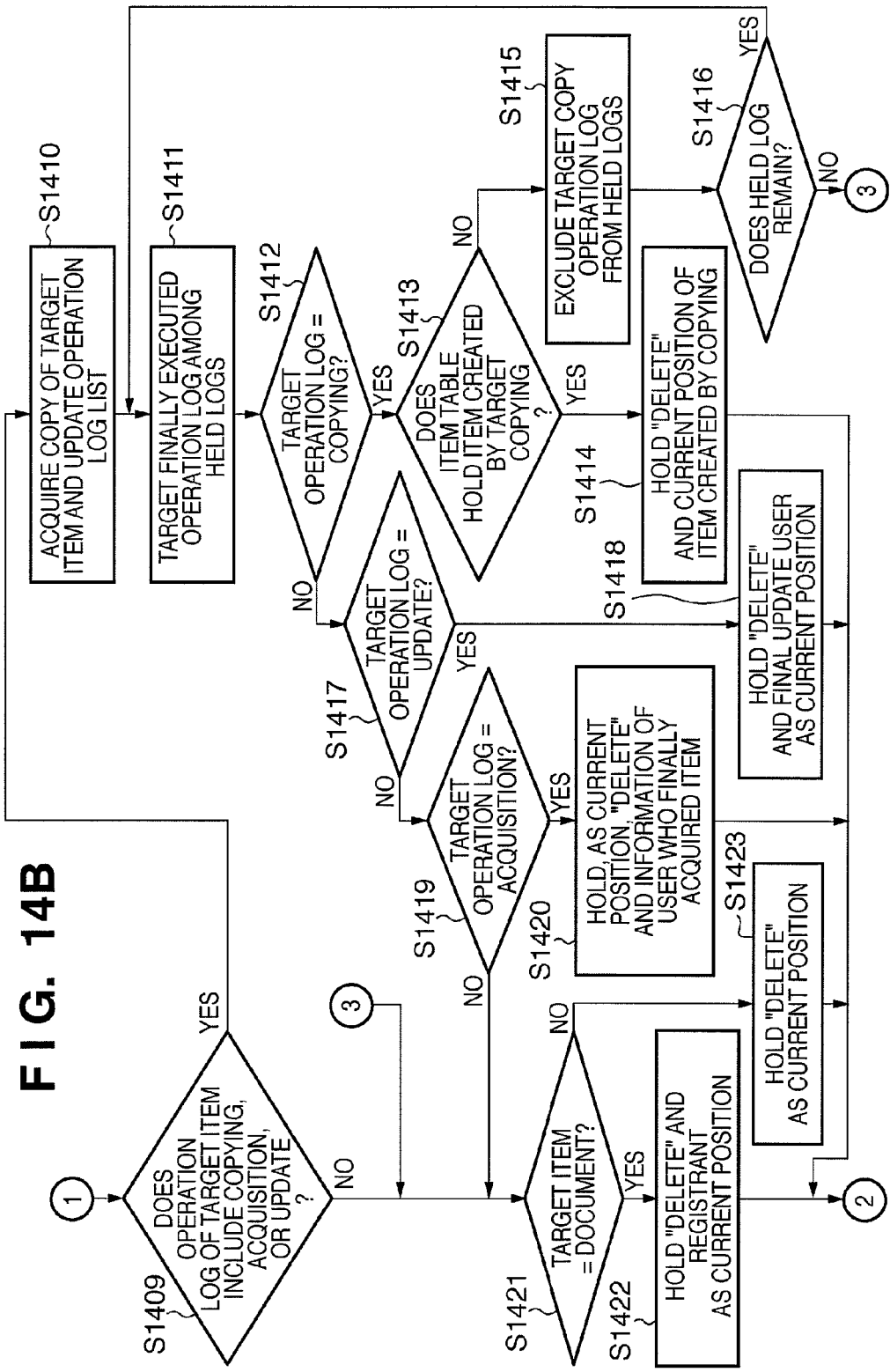

FIG. 15

| ITEM ID | ITEM NAME | ITEM TYPE | PARENT ITEM ID | ITEM ENTITY |
|---|---|---|---|---|
| 10001 | Project1 | FOLDER | 0 | ⋮ |
| 11000 | ESTIMATE | FOLDER | 10001 | ⋮ |
| 12000 | EXAMINATION | FOLDER | 10001 | ⋮ |
| 12092 | REQUIREMENTS V1.3 | DOCUMENT | 12000 | ⋮ |
| 20001 | 001.V1.0 | FOLDER | 10001 | ⋮ |
| 21000 | 001. EXAMINATION | FOLDER | 20001 | ⋮ |
| 12016 | V1.0 REQUIREMENTS | DOCUMENT | 21000 | ⋮ |
| 20002 | 002.V1.1 | FOLDER | 10001 | ⋮ |
| 20003 | 003.V1.2 | FOLDER | 10001 | ⋮ |
| 21100 | 001. EXAMINATION | FOLDER | 20003 | ⋮ |
| 16638 | V1.2 EXAMINATION NOTE 2 | DOCUMENT | 21100 | ⋮ |
| 20004 | 004.V1.3 | FOLDER | 10001 | ⋮ |
| 21200 | 001. EXAMINATION | FOLDER | 20004 | ⋮ |
| 11443 | V1.3 STEP-NUMBER ESTIMATE | DOCUMENT | 21200 | ⋮ |
| 12077 | V1.3 CONCEPT EXAMINATION MATERIALS | DOCUMENT | 21200 | ⋮ |
| 13212 | EXAMINATION OF NEW FUNCTIONS | DOCUMENT | 21200 | ⋮ |
| 21238 | REPRISE OF CONCEPT EXAMINATION | DOCUMENT | 21200 | ⋮ |
| 21210 | 002. REQUESTS | FOLDER | 20004 | ⋮ |
| 21220 | 003. DEVELOPMENT | FOLDER | 20004 | ⋮ |
| 21230 | 004. EVALUATION | FOLDER | 20004 | ⋮ |
| 21240 | 005. REVIEW | FOLDER | 20004 | ⋮ |
| ⋮ | ⋮ | ⋮ | ⋮ | ⋮ |

DOCUMENT MANAGEMENT APPARATUS, METHOD AND MEDIUM STORING PROGRAM

BACKGROUND OF THE INVENTION

1. Field of the Invention

The present invention relates to a document management apparatus, method, and medium for managing an electronic document.

2. Description of the Related Art

In recent years, document management systems have been widely used to share an electronic document between a plurality of users or save it for a long term. The document management system generally classifies and manages documents using a hierarchical structure of "folders" or "directories" which are document containers. For example, folders are commonly created for respective projects or organizations to classify documents.

As various kinds of documents are saved, a user may want to completely renew the classification system and rearrange documents. In this case, the user often takes the following procedure as one of popular methods. First, the user changes the name of a top folder to execute rearrangement. Then, he newly creates a blank folder with the original name on the same layer as that of the renamed folder. While creating a folder of a new classification, he moves a document from the renamed folder to the newly created folder.

According to this method, the user who rearranges documents may forget the positions of a document before and after rearrangement during long-time work. Then, he has to search for documents many times during the work, which is very troublesome.

As a measure to avoid such a labor, Japanese Patent Laid-Open No. 2006-48521 discloses a method of searching for a document to be arranged in a new folder under a plurality of document search conditions, or executing full-text retrieval using a keyword based on the folder name.

Japanese Patent Laid-Open No. 9-128380 discloses a system capable of managing the version of each folder to allow a user to confirm the state of the folder before a change occurs.

Japanese Patent Laid-Open No. 2002-82828 discloses a system which, when data is moved, automatically creates and registers a destination notification/search document in an original folder to notify a user that data has been moved and of the data destination.

However, the method described in Japanese Patent Laid-Open No. 2006-48521 cannot cope with a case in which it is difficult to create a search condition for classifying documents or set an appropriate keyword. This method is beneficial when there is an enormous number of documents and classification errors are permissible to a certain degree. In other cases, however, the user has to manually do the conventional troublesome work, and the method cannot reduce the burden.

The method described in Japanese Patent Laid-Open No. 9-128380 enables a user to confirm the state of a given folder before a change occurs. However, the user cannot easily confirm the current state of a document contained in the folder. Confirming the state of a rearranged document requires a lot of labor as usual.

The method described in Japanese Patent Laid-Open No. 2002-82828 allows a user to easily find out the destination of a document. However, the user cannot easily confirm the source of the document at its destination. Confirming the source folder is still cumbersome.

SUMMARY OF THE INVENTION

The present invention provides a document management apparatus capable of efficiently organizing the arrangement state of a document while comparing its past and current arrangement states.

The present invention in its first aspect provides a document management apparatus which manages documents using a hierarchical structure, the apparatus comprising:

a first table configured to hold a current position of a node in the hierarchical structure;

a second table configured to hold a past position of a node in the hierarchical structure;

a first user interface configured to display the current position held in the first table in correspondence with the past position held in the second table; and a second user interface configured to display the past position held in the second table in correspondence with the current position held in the first table.

The present invention in its second aspect provides a document management method executed in a document management apparatus which manages documents using a hierarchical structure, the method comprising:

a first holding step of holding a current position of a node in the hierarchical structure;

a second holding step of holding a past position of a node in the hierarchical structure;

a first display step of displaying the current position held in the first holding step in correspondence with the past position held in the second holding step; and a second display step of displaying the past position held in the second holding step in correspondence with the current position held in the first holding step.

The present invention in its third aspect provides a computer-readable medium storing a document management program for managing documents using a hierarchical structure, the program causing a computer to hold a current position of a node in the hierarchical structure, hold a past position of a node in the hierarchical structure, display the held current position in correspondence with the held past position, and display the held past position in correspondence with the held current position.

The present invention can efficiently organize the arrangement state of a document while comparing its past and current arrangement states. The present invention can reduce the burden on the user to organize documents.

Further features of the present invention will become apparent from the following description of exemplary embodiments with reference to the attached drawings.

BRIEF DESCRIPTION OF THE DRAWINGS

FIG. 7 is a view illustrating a table showing an example of an item table in the embodiment;

FIG. 8 is a view illustrating a table showing an example of a past arrangement state management table in the embodiment;

FIG. 9 is a view illustrating a table showing an example of a detailed past arrangement state table in the embodiment;

FIG. 10 is a view illustrating a table showing an example of an operation log table in the embodiment;

FIGS. 14A and 14B are showing a flowchart illustrating a processing sequence to display a past arrangement state in the folder organization window;

FIG. 15 is a view illustrating an example of an item table when the folder organization window shown in FIGS. 5A and 5B appears.

DESCRIPTION OF THE EMBODIMENTS

Figure 1:
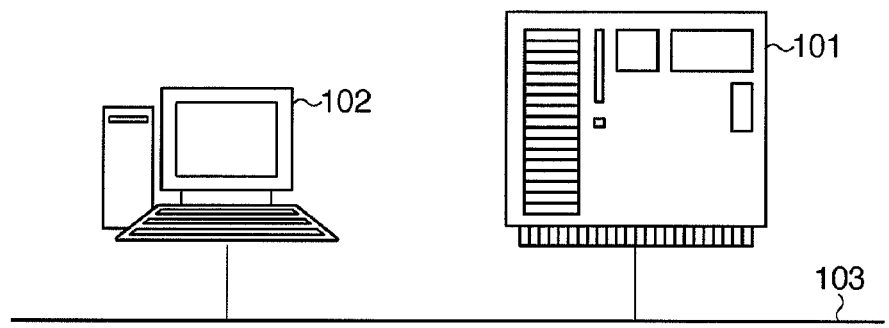
FIG. 1 is a view illustrating the configuration of a document management system according to an embodiment of the present invention.

A preferred embodiment of the present invention will be described in detail below with reference to the accompanying drawings. Note that the same reference numerals denote the same parts, and a repetitive description thereof will be omitted.

FIG. 1 is a view showing the configuration of a document management system according to the embodiment of the present invention.

Referring to FIG. 1, a document management server 101 manages documents using folders which can be given a hierarchical structure. A client computer 102 requests the document management server 101 to, for example, register or acquire a document or create a folder. The client computer 102 receives a processing result and displays it on the screen. A network 103 is, for example, the Internet. FIG. 1 shows only one server and one client computer for descriptive convenience, but a plurality of servers and a plurality of client computers are also available. In this embodiment, the client computer 102 works as an example of the document management apparatus.

Figure 2:
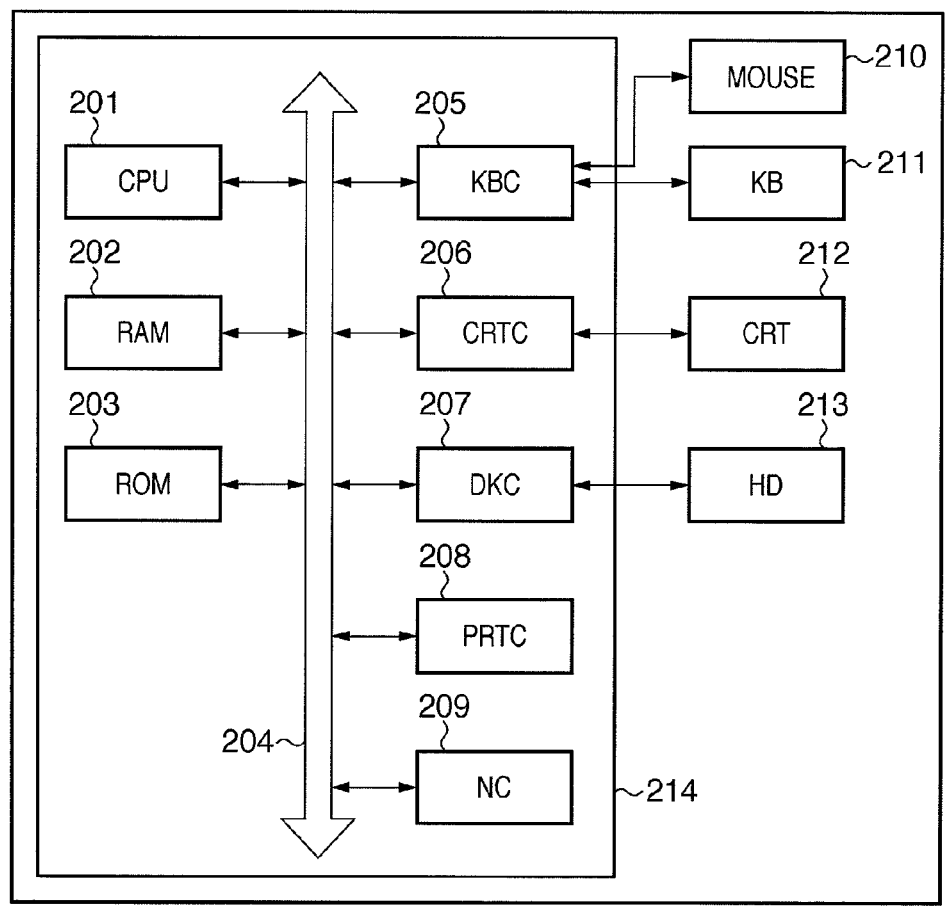
FIG. 2 is a block diagram illustrating the hardware arrangement of a document management server and client computer.

FIG. 2 is a block diagram showing the typical internal arrangement of the document management server 101 and client computer 102. Referring to FIG. 2, a CPU 201 in a main body 214 executes a program such as an OS which is stored in the program ROM of a ROM 203 or loaded from a hard disk (HD) 213 to a RAM 202. Especially in the document management server 101 of the embodiment, the CPU 201 loads a program from the hard disk 213 to the RAM 202 and executes it to perform each process in the embodiment.

The RAM 202 functions as a main memory, work area, and the like for the CPU 201. A keyboard controller (KBC) 205 controls a key input from a keyboard (KB) 211 and an input from a mouse 210 serving as a pointing device. Particularly in the embodiment, the client computer 102 uses the KBC 205 to accept input of a document name or press of a button on the screen by the user via the KB 211 or mouse 210.

A CRT controller (CRTC) 206 controls display on a display unit (CRT) 212. Particularly in the client computer 102 of the embodiment, the display unit 212 displays a user interface window via the CRTC 206 to perform document management of the embodiment. The display unit 212 is not limited to a CRT and may also be a liquid crystal display or the like.

A disk controller (DCK) 207 controls access between the hard disk 213 which stores a boot program, various applications, user data, and the like, and an external storage device (not shown) such as a flexible disk. In particular, the hard disk 213 of the document management server 101 of the embodiment stores a program for performing each process of the embodiment and a variety of data for document management.

A printer controller (PRTC) 208 controls exchange of signals with a printer when the printer is connected. Especially, the client computer 102 can use the PRTC 208 to print a document acquired from the document management server 101.

A network controller (NC) 209 is connected to a network, and executes communication control with another network-connected device. In particular, the NC 209 controls communication between the document management server 101 and the client computer 102. A bus 204 connects the CPU 201, RAM 202, and the like.

Windows displayed when performing document management by connecting the client computer 102 to the document management server 101 in the embodiment will be explained.

Upon connecting the client computer 102 to the document management server 101, a login window (not shown) appears first to input a user name and password for authenticating a user. When the user is authenticated, the display unit 212 of the client computer 102 displays a document management window shown in FIG. 3. This window allows the user to execute a basic operation in document management, including registration, moving, and copying of a document. The window will be explained with reference to FIG. 3.

Figure 3:
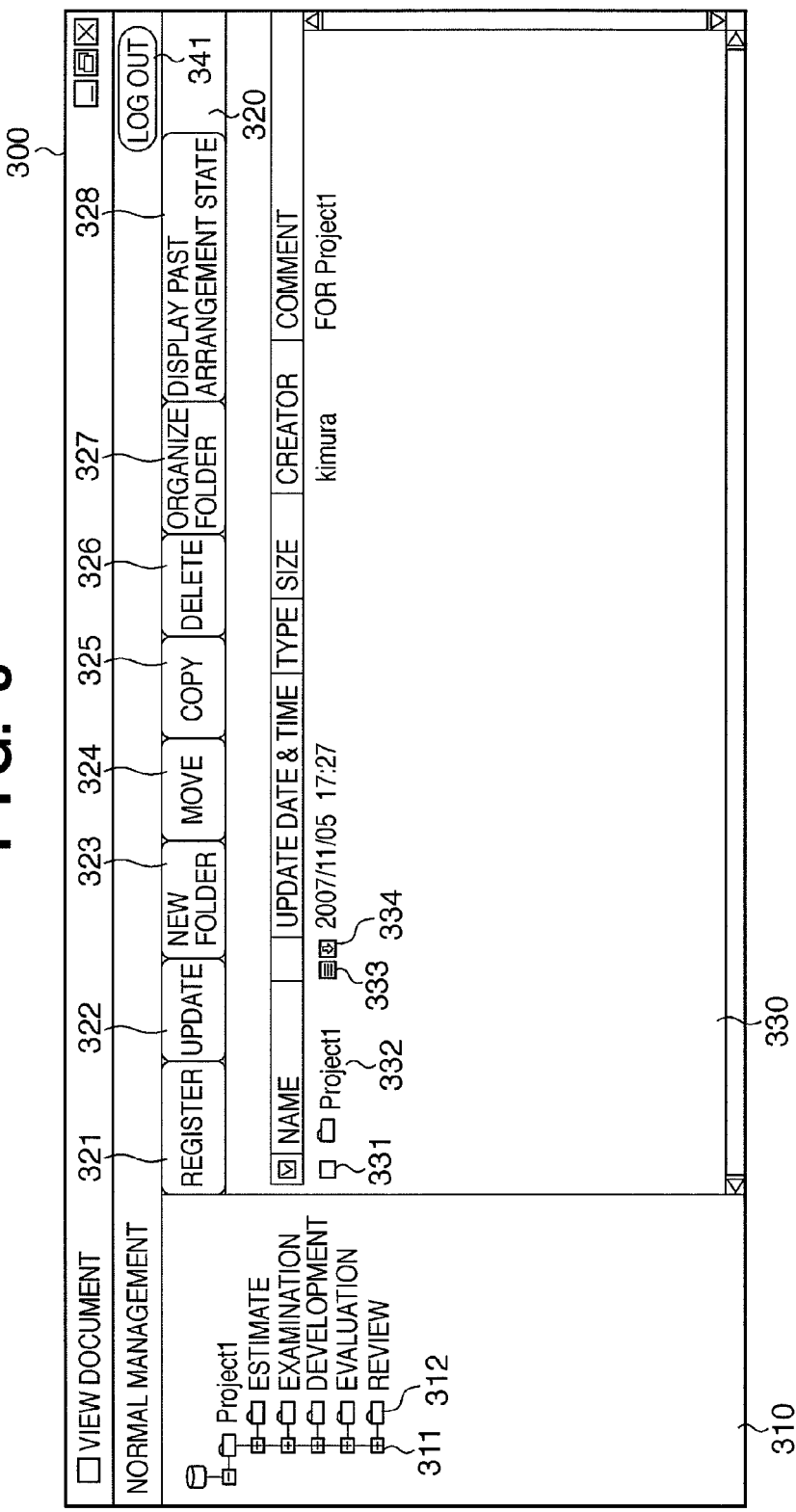
FIG. 3 is a view illustrating an example of a normal management window in the embodiment.

A normal management window 300 shown in FIG. 3 manages documents in a designated folder. A folder tree display area 310 displays the hierarchical structure of folders in a tree form to enable the user to designate a folder. Folders and documents in a hierarchical structure will also be generically referred to as nodes. The user can manage documents in a hierarchical structure on a user interface as shown in FIG. 3.

Each subfolder display button 311 switches the tree view between a state in which subfolders (child folders) in a corresponding folder are expanded and displayed and a state in which they are collapsed and hidden. When the button display is "+", subfolders are hidden. By pointing the cursor to the button with the mouse or the like and pressing the button, subfolders in a corresponding folder are expanded and displayed. The operation of pointing the cursor to a button with the mouse or the like and pressing the button will be simply referred to as "pressing a button". When the button display is "−", subfolders are expanded and displayed. By pressing the button, displayed subfolders are collapsed and hidden.

Each folder name label 312 displays a folder name. By pressing the folder name label, a corresponding folder is selected to display folders and documents contained in the selected folder in an item list display area 330 on the right side. When folders and documents are not discriminated, they will be generically called items. A menu display area 320 displays operation menus executable for an item in the window.

The user presses a register button 321 to read out a document stored in the client computer 102. The register button 321 is used to write a readout document in an item table (to be described later) in the hard disk of the document management server 101 and register it as a new document in the management system of the document management server 101

The user presses an update button 322 to read out a document stored in the client computer 102, and write it in the item table of the document management server 101 so as to overwrite and update a document selected in the item list display area 330. Original data of the updated document that has been saved in the item table of the document management server 101 is deleted.

The user presses a new folder button 323 to newly create a subfolder in a folder displayed in the item list display area 330. The user presses a move button 324 to move an item selected in the item list display area 330 below an arbitrary folder. The user presses a copy button 325 to copy an item selected in the item list display area 330 below an arbitrary folder. The user presses a delete button 326 to delete an item selected in the item list display area 330. Data of the deleted item is also deleted from the item table in the document management server 101, and deleted from the management system of the document management server.

When organizing the arrangement states of items contained in a folder selected in the item list display area 330, the user presses a folder organization button 327 to store, in the document management server 101, the arrangement states of items in the folder before the start of organization. The user presses a past arrangement state display button 328 to display an arrangement state stored in the document management server 101 when he pressed the folder organization button 327.

The item list display area 330 displays a list of items contained in a folder selected in the folder tree display area 310 or item list display area 330. A check box 331 is used to select a target item displayed in the menu display area 320.

A name display area 332 displays an item name. When the item is a folder, the name display area 332 can be pressed. By pressing the name display area 332, the item list display area 330 newly displays an item contained in the folder.

The user presses a property display button 333 to display detailed attribute information of an item, and can confirm and edit it. The user presses an acquisition button 334 to download an item from the hard disk of the document management server 101 to that of the client computer 102. When the item is a document, only the document is downloaded. When the item is a folder, all items contained in the folder are downloaded. The user presses a logout button 341 to end the operation of the document management system. After the user presses the logout button to log out, the display switches to the login window to log in to the document management system by inputting a user name and password.

A window (FIG. 4) displayed when the user selects a folder "Project1" and presses the folder organization button 327 in FIG. 3 will be explained.

Figure 4:
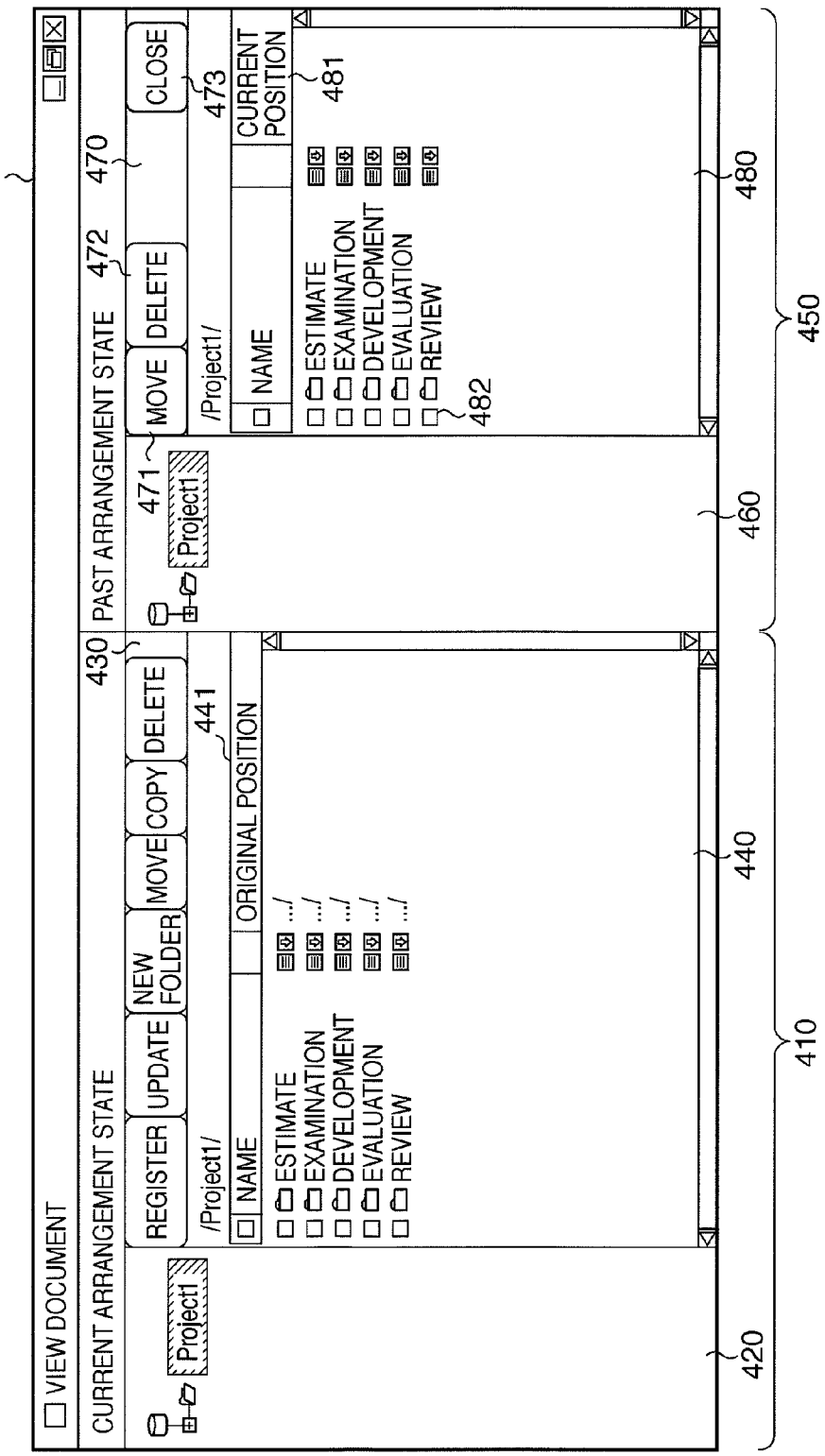
FIG. 4 is a view illustrating an example of a folder organization window in the embodiment.

A folder organization window 400 shown in FIG. 4 executes organization of folders. A current arrangement state display area 410 displays the latest arrangement state. Immediately after pressing the folder organization button 327 in FIG. 3, the same arrangement state as that in FIG. 3 is displayed. Display contents in the current arrangement state display area 410 exemplify the current positions of respective layers displayed by the first display.

A current folder tree display area 420 displays a folder tree in the latest arrangement state. The operation in this area is the same as that in the folder tree display area 310 of FIG. 3. An operation button display area 430 displays operation buttons executable for an item in the current arrangement state display area 410. The operations of a register button, update button, new folder button, move button, copy button, and delete button displayed in this area are the same as those of buttons with the same names in FIG. 3.

An item list display area 440 displays a list of items in the current arrangement state. An original position display area 441 represents a folder to which each item in the item list display area 440 for the current arrangement state belonged when the user pressed the folder organization button 327 in FIG. 3. FIG. 4 shows a window immediately after pressing the folder organization button 327. Hence, no item has moved, and " . . . /" is displayed as its original position. " . . . " represents a folder selected upon pressing the folder organization button 327. "/" is the delimiter of a folder layer. In the embodiment, the user cannot use "/" in an item name.

A past arrangement state display area 450 displays an arrangement state obtained when the user pressed the folder organization button 327. A past folder tree display area 460 displays a folder tree in the past arrangement state. The operation in this area is the same as that in the folder tree display area 310 of FIG. 3. Display contents in the past arrangement state display area 450 exemplify the past positions of respective layers displayed by the second display.

An operation button display area 470 displays operation buttons executable for an item in the past arrangement state display area 450. The user presses a move button 471 to move, below a folder displayed in the current arrangement state display area 410 for the current arrangement state, an item selected by checking a check box 482 in an item list display area 480 for the past arrangement state.

The user presses a delete button 472 to delete an item selected by checking the check box 482 in the item list display area 480 for the past arrangement state. The user presses a close button 473 to return from the folder organization window 400 to the normal management window 300.

The item list display area 480 displays a list of items in the past arrangement state. A current position display area 481 represents a folder to which each item in the item list display area 480 for the past arrangement state belongs in the latest arrangement state. FIG. 4 shows a window immediately after pressing the folder organization button 327. Thus, no item has moved, and nothing is displayed as a current position. The check box 482 is used to select a target item displayed in the operation button display area 470 for the past arrangement state.

Figure 5A:
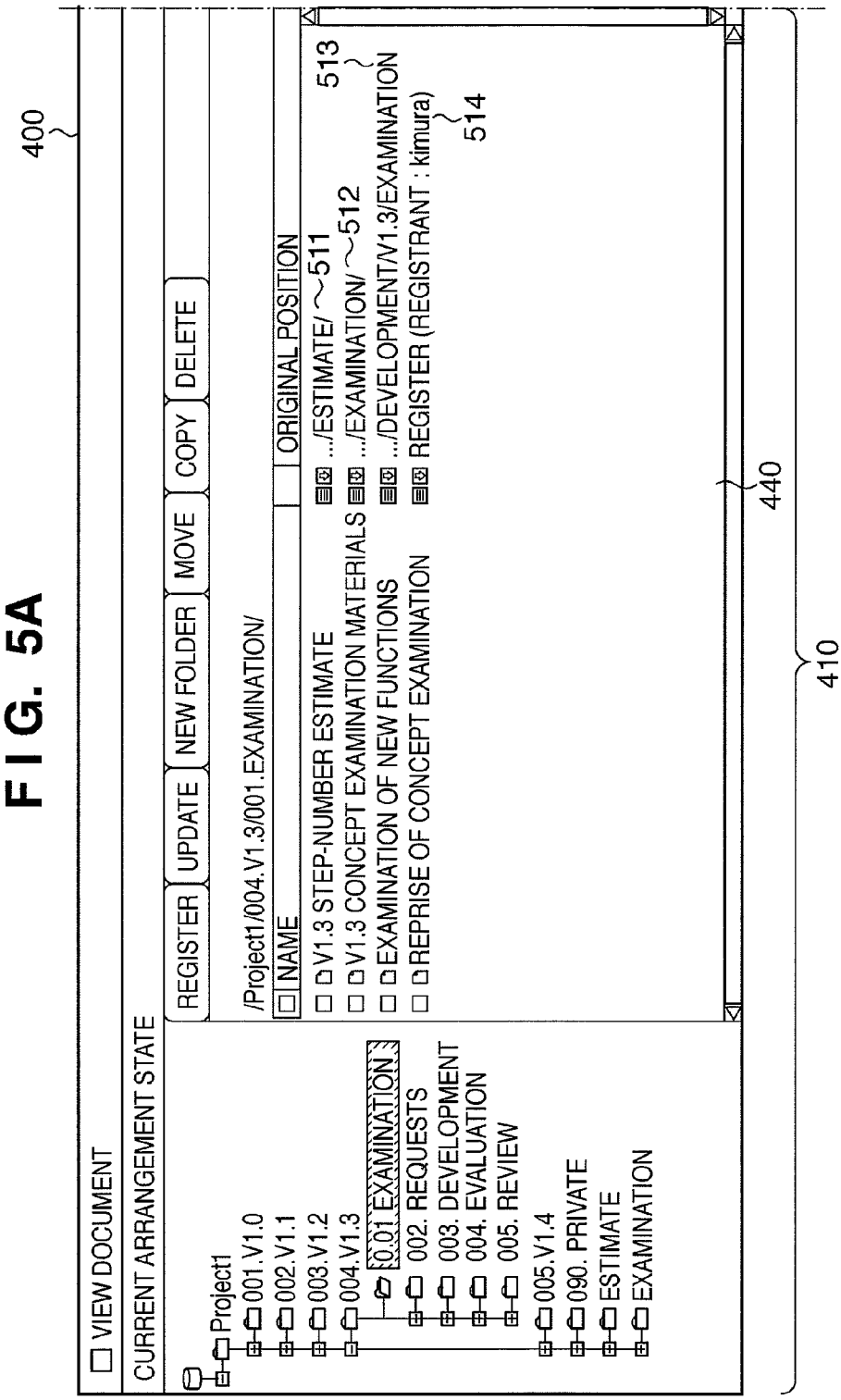
FIGS. 5A and 5B are showing a view illustrating another example of the folder organization window in the embodiment.
Figure 5B:
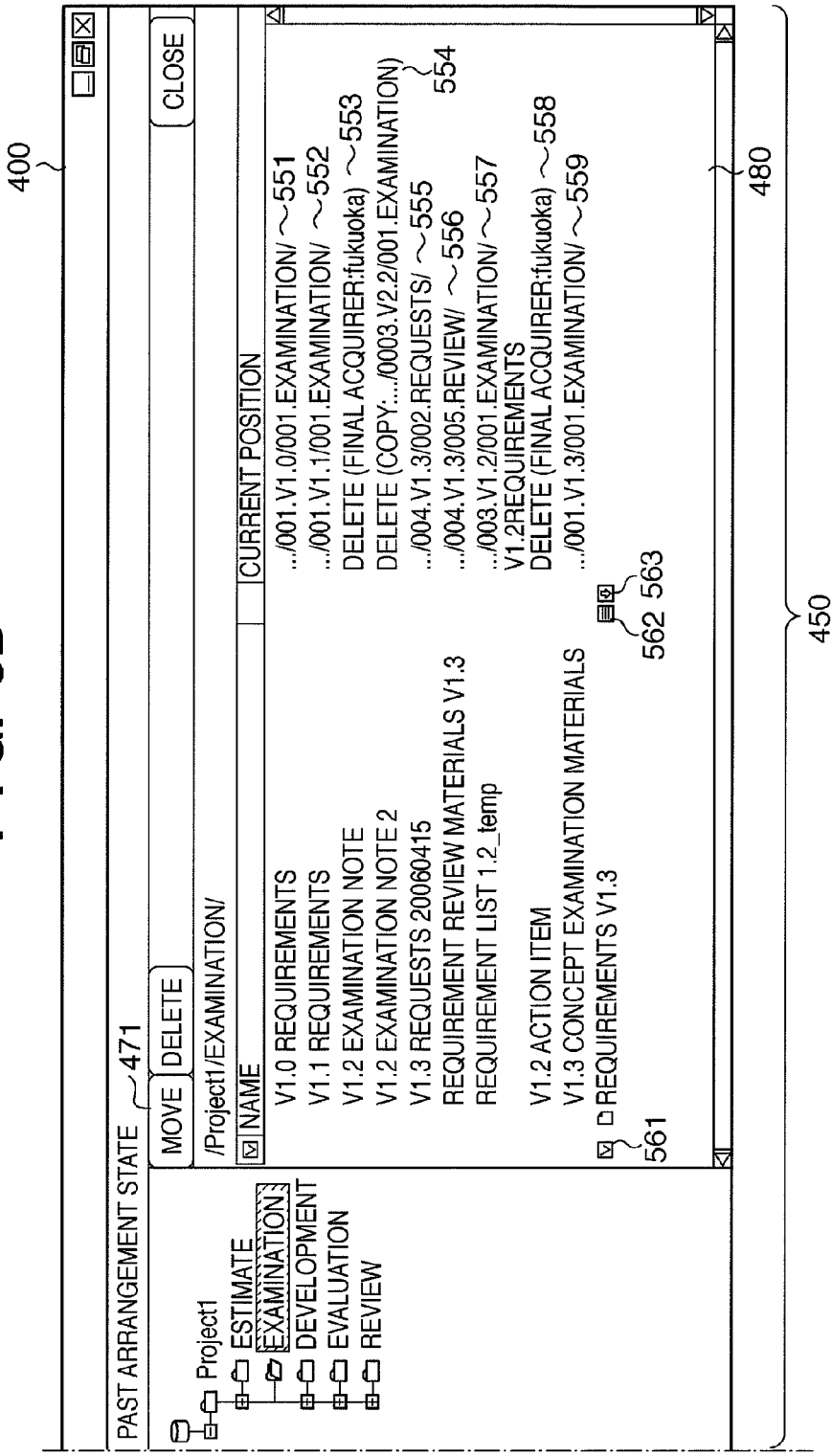

A folder organization window (FIGS. 5A and 5B) when folders are organized to a certain degree and past and current arrangement states differ from each other will be explained. In FIGS. 5A and 5B, displays 511 to 514 are presented as original positions in the item list display area for the current arrangement state.

In the displays 511 to 513, pieces of information on original folders in the past arrangement state are presented in correspondence with respective documents in the current arrangement state display area 410. For example, the display 511 represents that a document "V1.3 step-number estimate" resided in "/Project1/estimate/" in the past arrangement state.

The paths of original positions in the displays 511 to 513 function as links. By pointing the mouse cursor to a target path and clicking the path, a folder displayed in the past arrangement state display area 450 changes to one on the clicked path. The user can easily confirm other documents at a position where the target document in the current arrangement state was arranged in the past arrangement state. This prevents the user from, for example, missing a folder undergoing rearrangement before the end of organizing documents, and thus can reduce the burden on the user.

The display 514 represents that there was no document in the past arrangement state and a user named "kimura" pressed the folder organization button 327 to register a document. The display 514 allows the user to easily confirm information on the process of a document displayed in the current state, which cannot be obtained conventionally unless the operation log of the document is displayed by a button operation or the like.

In the item list display area for the past arrangement state, displays 551 to 559 are displayed as current positions in correspondence with respective documents displayed in the past arrangement state display area 450. The displays 551, 552, 555 to 557, and 559 represent folders in which documents are arranged in the current arrangement state. For example, the display 551 represents that a document "V1.0 requirements" now resides in a folder "/Project1/001.V1.0/001.examination/". The paths of current positions in the displays 551, 552, 555 to 557, and 559 function as links. By pointing the mouse cursor to a target path and clicking the path, a folder displayed in the current arrangement state display area 410 changes to one on the clicked path. The user can easily confirm a document in the past arrangement state, and other documents at a position where the document in the past arrangement state is arranged now.

The display 553 represents that a document was deleted and acquired before deletion by a user named "fukuoka". The display 553 enables the user to easily confirm the contents of a document deleted from the document management server 101, and get a clue to obtain the document. Note that a user name line may be designed to be clickable with the mouse cursor. When a user name line is clicked, an inquiry may be automatically sent to the user by mail or the like.

The display 554 represents that a document was deleted and a copy of the document created before deletion now resides in a folder "/Project1/003.V2.2/001.examination/". The path of a position where the copy of the document resides functions as a link. By pointing the mouse cursor to a target path and clicking the path, a folder displayed in the current arrangement state display area 410 changes to one on the clicked path. From the display 554, the user can easily confirm a copy of a document.

The display 558 represents that a document was deleted and updated before deletion by a user named "fukuoka". Similar to the display 553, the display 558 allows the user to easily confirm the contents of a document deleted from the document management server 101, and get a clue to obtain the document. Also, a user name line may be designed to be clickable with the mouse cursor. When a user name line is clicked, the user may be automatically asked by mall or the like. A check box 561, property button 562, and acquisition button 563 in the item list display area for the past arrangement state appear for only a document which has been neither moved nor deleted upon pressing the folder organization button 327.

A window (FIG. 6) when the user selects the folder "Project1" and presses the past arrangement state display button 328 in FIG. 3 will be explained.

Figure 6:
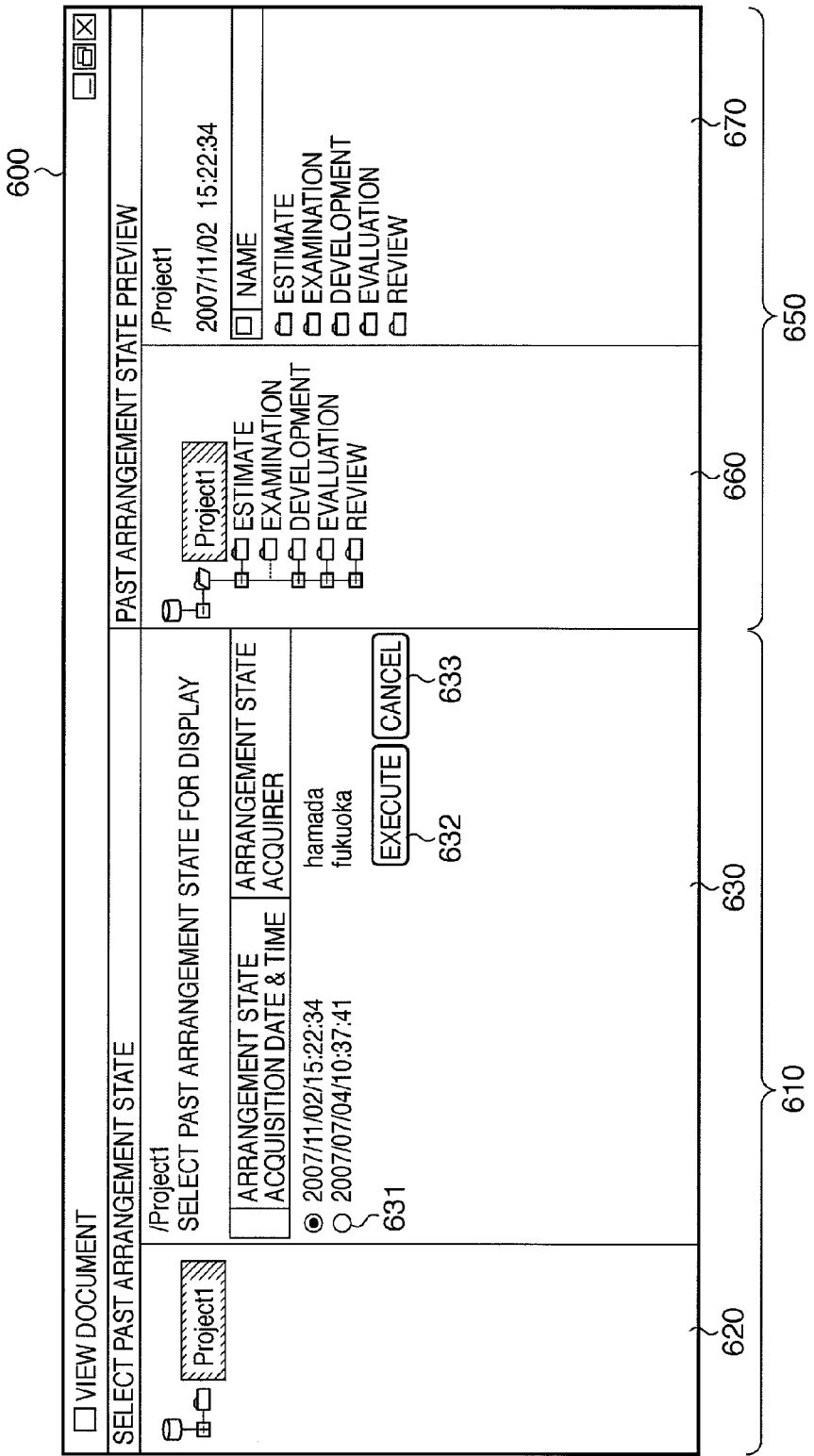
FIG. 6 is a view illustrating an example of a past arrangement state selection window in the embodiment.

A past arrangement state selection window 600 shown in FIG. 6 enables the user to select a past arrangement state to be displayed. A past arrangement state selection display area 610 displays selectable past arrangement states. A selected folder display area 620 displays, in a tree form, a folder selected upon pressing the past arrangement state display button 328 in FIG. 3. A past arrangement state list display area 630 displays a list of past arrangement states held in the past for a folder selected upon pressing the past arrangement state display button 328 in FIG. 3. When the target folder does not have a past arrangement state, the past arrangement state list display area 630 notifies that there is no past arrangement state, and displays a button (not shown) to return to the previous window.

The user presses a radio button 631 to display a selectable past arrangement state. By checking the button, a corresponding past arrangement state is selected. Further, the selected past arrangement state is displayed in a past arrangement state preview display area 650 on the right side of the window. An execution button 632 is used to display a past arrangement state selected by checking the radio button 631. The execution button 632 is pressed to switch the display to the window as shown in FIG. 4 or 5. A cancel button 633 is used to cancel execution of the past arrangement state display and return to the previous window.

The past arrangement state preview display area 650 displays a past arrangement state selected in the past arrangement state selection display area 610 for confirmation. A past arrangement state folder tree preview display area 660 displays folder layers in a past arrangement state to be previewed in the tree form. A past arrangement state item list preview display area 670 displays a list of items contained in a folder selected in the past arrangement state folder tree preview display area 660.

An item table which manages the attributes (e.g., name) and entity of an item and the like will be explained.

FIG. 7 shows an example of the item table in the embodiment. The item ID uniquely identifies an item. The item name is the name of an item. Document management according to the embodiment inhibits arranging a plurality of documents having the same name and a plurality of folders having the same name in a single folder for management convenience. Note that one folder and one document can be arranged with the same name. The contents of the table shown in FIG. 7 exemplify the current positions of respective layers held in the first table.

The item type represents which of a folder and document is an item. The parent item ID is the item ID of a folder containing the target item. An item arrangement state displayed in the normal management window 300 or the like is logically generated based on the parent item ID. A folder at the top has a parent item ID "0". The item entity is file data of a document. For a folder, the item entity is "NULL". The item table manages other kinds of attribute information such as the creation date & time, final update date & time, and size.

Referring to FIG. 7, for example, an item of an item ID "12000" is a folder of a name "examination", and belongs to a folder of an item ID "10001" and name "Project1".

Tables (FIGS. 8 and 9) which manage a past arrangement state held by pressing the folder organization button 327 will be explained.

FIG. 8 shows a past arrangement state management table which manages a past arrangement state. The past arrangement state ID identifies a past arrangement state. The item ID is that of a folder to acquire a past arrangement state. The arrangement state acquisition date & time is the date & time when a past arrangement state was acquired. The arrangement state acquirer is the name of a user who acquired a past arrangement state.

Referring to FIG. 8, a record of a past arrangement state ID "300" represents a past arrangement state acquired by a user named "fukuoka" for a folder of an item ID "10001" on 2007 Jul. 2 10:37:41.

FIG. 9 shows a detailed past arrangement state table which holds detailed arrangement information corresponding to each record in the past arrangement state management table. This table holds the arrangement states of all items contained in a folder to acquire a past arrangement state.

The past arrangement state ID is that of a record in a corresponding past arrangement state in the past arrangement state management table. The item ID, name, item type, and parent item ID are the same as those described in the item table of FIG. 7 except that they are information in a past arrangement state.

For example, an item of an item ID "12016" has a past arrangement state ID "301". This item is a document of a name "V1.0 requirements" upon acquisition and belongs to a folder of an item ID "12000" and name "examination".

The contents of the tables shown in FIGS. 8 and 9 exemplify the past positions of respective layers held in the second table.

An operation log table (FIG. 10) which manages an operation log will be explained. The operation ID identifies an operation executed by a user. The target item ID is the item ID of an operated item. The operator is the name of a user who executed an operation. The operation source ID represents a folder containing an operated item, and is the parent item ID of the operated item.

The operation source path is the path of a folder indicated by an operation source ID. The operation source ID and operation source path are "NULL" when the operation is "register" or "copy (new)". "Copy (new)" is an operation recorded at the same time as copying as the operation log of an item newly created by copying when the user performed copying.

The operation destination ID is the parent item ID of an operated item. The operation destination path is the path of a folder indicated by an operation destination ID. The operation destination ID and operation destination path hold values when the operation is "register", "move", or "copy (new)". For "copy (new)", the parent item of an item newly created by copying is recorded as an operation destination.

The new item ID is the item ID of an item newly created by copying. The new item ID does not hold any value for any operation other than copying. The operation date & time is the date & time when an operation was done.

Although not shown, the operation log table also has a column for holding the change contents of an operation to change the property of an item such as the document name. When a folder is moved, copied, or deleted, items contained in the folder are also moved, copied, or deleted together. In this case, the operation logs of these items are recorded simultaneously.

For example, the operation log of an operation ID "114" represents an operation executed by a user named "fukuoka" on 2007 Nov. 5 13:48:05. This operation was done for an item of an item ID "12077". More specifically, this operation log represents that an item was moved from a folder of an item ID "12000" and operation source path "/Project1/examination/" to that of an item ID "21200" and operation destination path "/Project1/004.V1.3/001.examination/". The contents of the table shown in FIG. 10 exemplify an operation log held in the third table.

<Processing Sequence in Normal Management Window>

Figure 11:
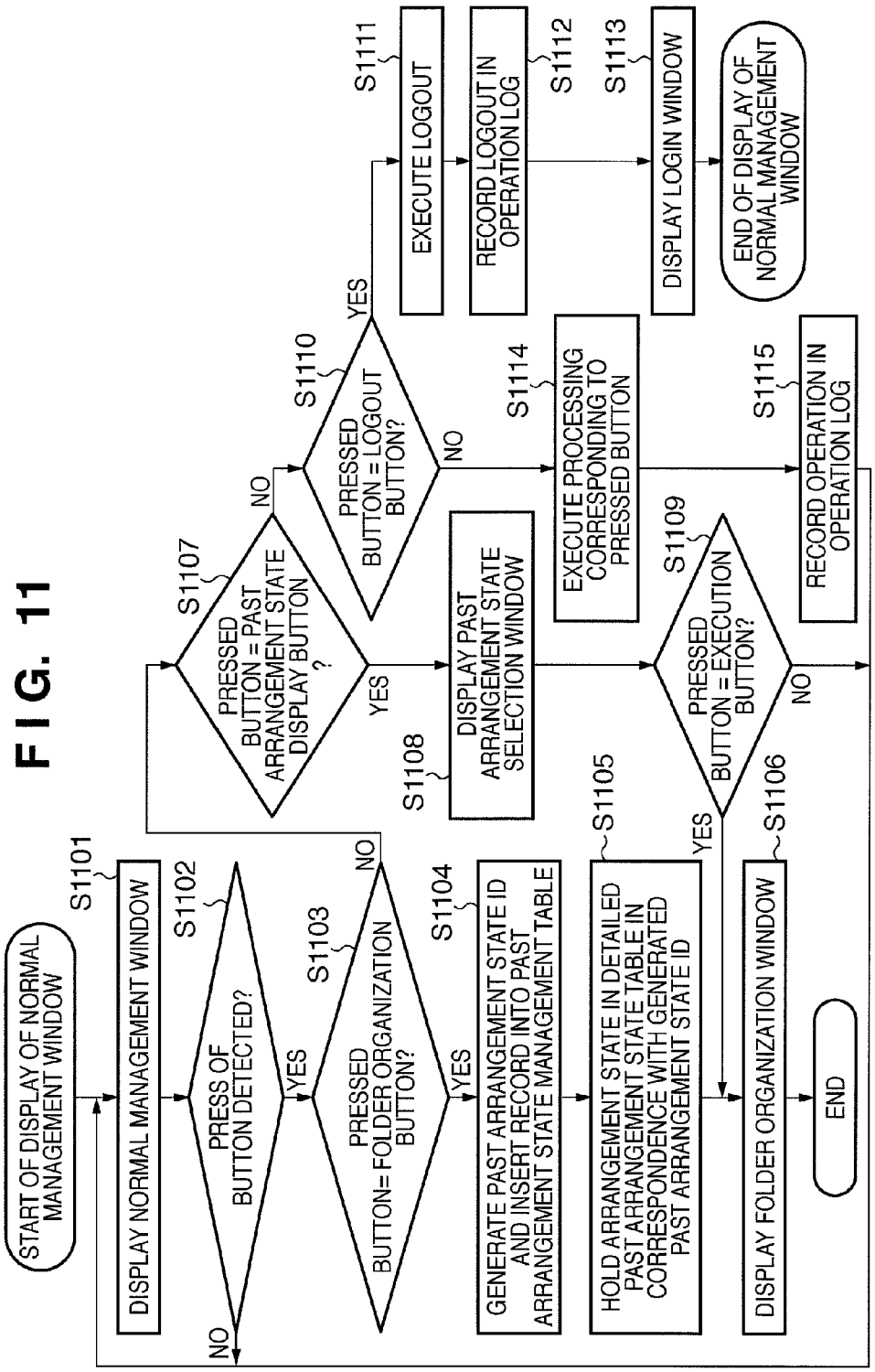
FIG. 11 is a flowchart illustrating a processing sequence executed using the normal management window.

A processing sequence in the normal management window will be described with reference to FIG. 11. For example, the CPU 201 of the client computer 102 executes the processing shown in FIG. 11.

In step S1101, the CPU 201 displays the normal management window 300. Immediately after login, the CPU 201 displays the normal management window 300 for a folder set to be displayed after login. After that, the CPU 201 updates the display based on an immediately preceding operation result.

In step S1102, the CPU 201 waits until the user presses various operation buttons or the like. In step S1103, the CPU 201 determines whether the pressed button is the folder organization button 327. If the pressed button is the folder organization button 327, the process advances to step S1104; if it is not the folder organization button 327, to step S1107.

In step S1104, the CPU 201 generates a past arrangement state ID and inserts a new record to the past arrangement state management table to hold the arrangement state of a selected folder. In step S1105, the CPU 201 acquires item arrangement information from the item table, and stores it into the new record of the detailed past arrangement state table that has been inserted in step S1104. In step S1106, the CPU 201 displays the folder organization window 400 based on a folder selected upon pressing the folder organization button and the past arrangement state ID generated in step S1104.

In step S1107, the CPU 201 determines whether the pressed button is the past arrangement state display button 328. If the pressed button is the past arrangement state display button 328, the process advances to step S1108; if it is not the past arrangement state display button 328, to step S1110.

In step S1108, the CPU 201 displays the past arrangement state selection window 600 based on a folder selected upon pressing the past arrangement state display button 328. In step S1109, the CPU 201 determines which of the execution button and cancel button has been pressed in the past arrangement state selection window 600. If the execution button has been pressed, the process advances to step S1106. In step S1106, the CPU 201 displays the folder organization window 400 as a selected past arrangement state based on the folder selected upon pressing the past arrangement state display button 328. If the cancel button has been pressed, the process advances to step S1101 to return to the normal management window.

In step S1110, the CPU 201 determines whether the pressed button is the logout button 341. If the pressed button is the logout button 341, the process advances to step S1111; if it not the logout button 341, to step S1114.

In step S1111, the CPU 201 executes logout processing. In step S1112, the CPU 201 records the logout operation in the operation log. In step S1113, the CPU 201 displays a login window after logout, and ends the processing.

In step S1114, the CPU 201 executes processing corresponding to the pressed button. For example, when the pressed button is the register button 321, the CPU 201 displays a window (not shown) for selecting a document to be registered in the client computer 102 and inputting a document name and the like. For example, the user selects a document and executes "register" in accordance with the window display. Then, the document management server 101 issues an item ID for identifying the document, and holds it in the item table.

In step S1115, the CPU 201 records the operation executed in step S1114 in the operation log, and if necessary, displays or updates the normal management window 300 (step S1101). In step S1115, for example, when the operation executed in step S1114 is registration of a document, the CPU 201 records an operation ID issued to identify the executed operation. An item ID issued for the registered document, operator, operation name, operation destination ID, operation destination path, and operation date & time are recorded as the operation log together with the operation ID. For example, an operation log (register) is recorded as represented by a record of an operation ID "37" shown in FIG. 10.

<Processing Sequence in Folder Organization Window>

Figure 12:
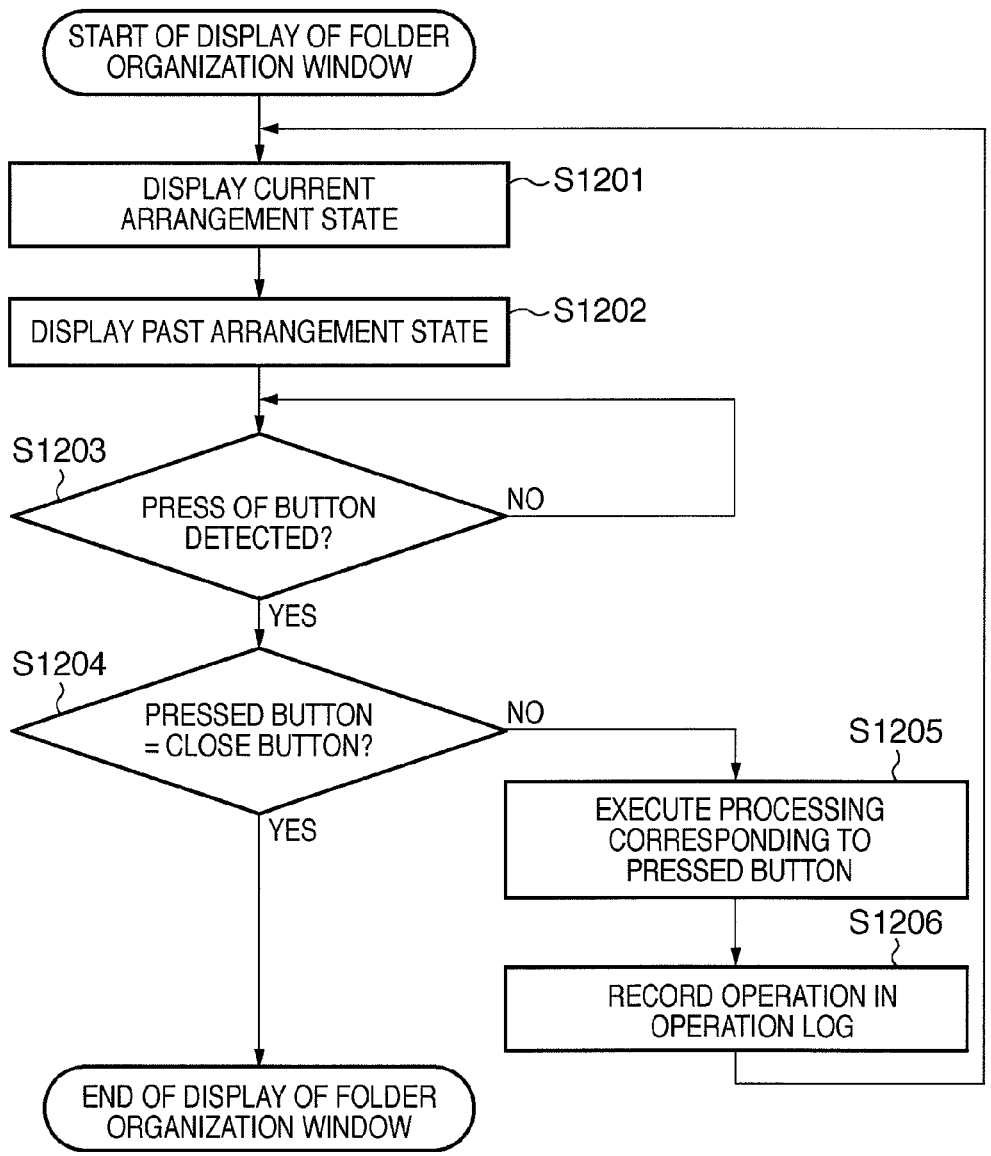
FIG. 12 is a flowchart illustrating a processing sequence executed using the folder organization window.

A processing sequence in the folder organization window 400 will be described with reference to FIG. 12. For example, the CPU 201 of the client computer 102 executes the processing shown in FIG. 12.

In step S1201, the CPU 201 displays the current arrangement state display area 410. In step S1202, the CPU 201 displays the past arrangement state display area 450. In step S1203, the CPU 201 waits until the user presses various operation buttons or the like. In step S1204, the CPU 201 determines whether the pressed button is the "close" button. If the pressed button is the "close" button, the CPU 201 ends the display of the folder organization window 400. If the pressed button is not the "close" button, the process advances to step S1205.

In step S1205, the CPU 201 executes processing corresponding to the pressed button. Assume that the user selects a document "requirements V1.3" in the item list display area 480 for the past arrangement state in FIGS. 5A and 5B, and presses the move button 471. In this case, the parent item ID of the record "requirements V1.3" in the item table changes to the item ID of a folder "001. examination" on "/Project1/004.V1.3/" displayed in the current arrangement state display area 410. In this manner, the user can operate a folder in the folder organization window 400.

In step S1206, the CPU 201 records the operation executed in step S1205 in the operation log, and if necessary, updates the display. Then, the process returns to step S1201.

<Processing Sequence to Display Current Arrangement State in Folder Organization Window>

Figure 13:
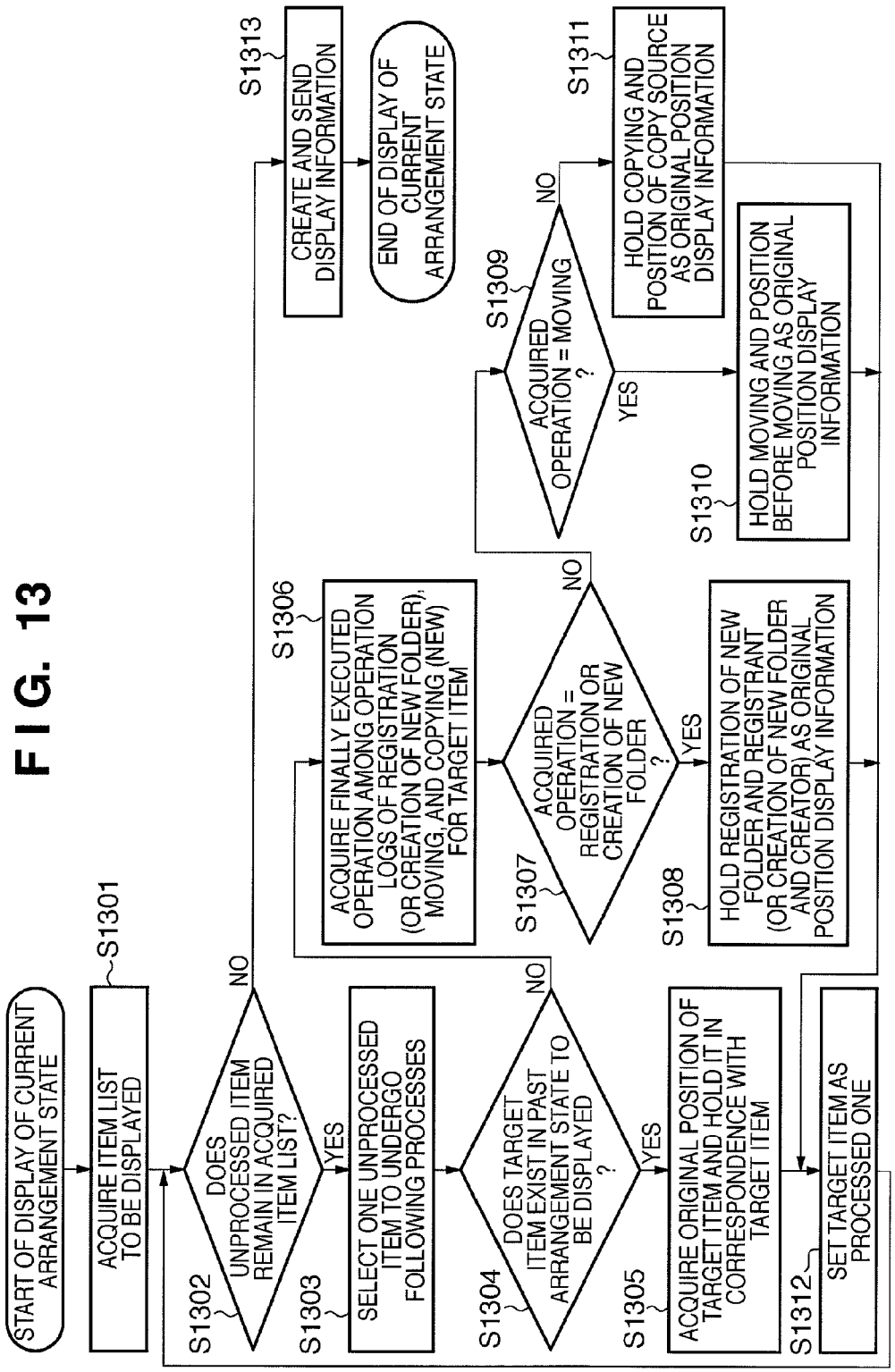
FIG. 13 is a flowchart illustrating a processing sequence to display a current arrangement state in the folder organization window.

A processing sequence to display a current arrangement state in the folder organization window 400 will be described with reference to FIG. 13. For example, the CPU 201 of the client computer 102 executes the processing shown in FIG. 13.

In step S1301, the CPU 201 acquires an item list to be displayed from the item table to display the contents of a folder displayed in the normal management window 300. In step S1302, the CPU 201 determines whether an unprocessed item remains in the acquired item list. If an unprocessed item remains, the process advances to step S1303; if no unprocessed item remains, to step S1313.

In step S1303, the CPU 201 selects one of unprocessed items from the acquired item list as a target item. In step S1304, the CPU 201 determines whether the item ID of the target item is held in the detailed past arrangement state table managing a record which is identified by a past arrangement state ID and is to be displayed in the past arrangement state display area 450. If a corresponding record exists, the process advances to step S1305; if it does not exist, to step S1306. In step S1305, the CPU 201 acquires the position of the target item in the past arrangement state from the detailed past arrangement state table. Shift to step S1306 as a result of the determination in step S1304 means that the item has been newly arranged.

In step S1306, the CPU 201 searches the operation log table for the item ID of the target item to acquire a finally executed operation log among the operation logs of registration (or creation of a new folder when the item is a folder), moving, and copying (new) performed for the item.

In step S1307, the CPU 201 determines which of registration and creation of a new folder is the operation acquired in step S1306. If the acquired operation is registration or creation of a new folder, the process advances to step S1308; if it is neither of them, to step S1309.

In step S1308, if the operation acquired in step S1306 is registration, the CPU 201 holds information "register (registrant: <user name>)" as original position display information. This information clarifies that the item was registered after acquiring a past arrangement state, and also clarifies the name of a user who registered the item. The line "<user name>" holds an actual user name (this also applies to the following description), as represented by the display 514 in FIGS. 5A and 5B.

If the operation acquired in step S1306 is creation of a new folder, the CPU 201 holds information "creation of a new folder (creator: <user name>)" as original position display information. This information clarifies that a new folder was created after acquiring a past arrangement state, and also clarifies the name of a user who created the new folder.

In step S1309, the CPU 201 determines whether the operation acquired in step S1306 is moving. If the acquired operation is moving, the process advances to step S1310; if it is not moving, to step S1311.

In step S1310, the CPU 201 holds information "move (moving source: <operation source path>)" using the operation source path as original position display information. This information clarifies that the item was moved after acquiring a past arrangement state, and also clarifies the moving source. The line "<operation source path>" holds an actual operation source path (this also applies to the following description).

In step S1311, the operation acquired in step S1306 is neither registration nor moving, so the CPU 201 determines that the operation is "copy (new)". The CPU 201 holds information "copy (copy source: <operation source path> <item name>)" using the operation source path and the item name of a copy source item. This information clarifies that the item was created by copying, and also clarifies the copy source. The line "<item name>" holds an actual item name.

In step S1312, the CPU 201 determines that the target item has been processed, and excludes it from process targets. After that, the process returns to step S1302 to target the next unprocessed item.

In step S1313, the CPU 201 generates display information based on the pieces of held information, and sends it to the display unit 212. Then, the process ends.

<Processing Sequence to Display Past Arrangement State in Folder Organization Window>

A processing sequence to display a past arrangement state in the folder organization window will be described with reference to FIGS. 14A and 14B. For example, the CPU 201 of the client computer 102 executes the processing shown in FIGS. 14A and 14B.

In step S1401, the CPU 201 acquires, as an item list to be displayed from the detailed past arrangement state table, a record which has a past arrangement state ID in a past arrangement state to be displayed and has, as a parent item ID, the item ID of a folder displayed in the normal management window.

In step S1402, the CPU 201 determines whether an unprocessed item remains in the acquired item list. If an unprocessed item remains, the process advances to step S1403. If all the items have been processed, the process advances to step S1425. In step S1403, the CPU 201 selects one of unprocessed items from the acquired item list as a target item.

In step S1404, the CPU 201 determines whether the item table holds an item having the target item ID. If the item table holds a corresponding record, the process advances to step S1405; if it does not hold the record, to step S1409. Shift to step S1409 as a result of the determination in step S1404 means that the item was deleted.

In step S1405, the CPU 201 acquires the current position of the target item from the item table. In step S1406, the CPU 201 determines whether the acquired current position matches a position in the past arrangement state. This determination is made based on whether the character string of a path indicating the current position coincides with that of a path in the past arrangement state.

The path indicating the current position is obtained by tracking back a parent item ID in the item table up to a folder (item identified by a past arrangement state ID held in the past arrangement state management table) selected when the past arrangement state was acquired, and linking the names of detected items from the top layer.

The path indicating a position in the past arrangement state is attained by tracking back a parent item ID in the detailed past arrangement state table up to an item having a parent item ID "0", and linking the names of detected items from the top layer.

For example, in the detailed past arrangement state table in FIG. 9, a document "V1.0 requirements" in the item list display area 480 for the past arrangement state in FIGS. 5A and 5B has "/Project1/examination/" as the past arrangement state. Also, in FIG. 15 showing an example of the item table corresponding to the state in FIGS. 5A and 5B, the document "V1.0 requirements" now has "/Project1/001.V1.0/001.examination" as the current arrangement state. In this way, if the obtained paths do not match each other, the process advances to step S1407; if they match each other, to step S1408.

In step S1407, the CPU 201 holds a current position as current display information. Since the target item has been neither moved nor deleted, its entity has not moved, either. Thus, in step S1408, the CPU 201 sets flags for displaying a selection check box necessary to move or delete the item, a property button, and an acquisition button.

In step S1409, the CPU 201 searches the operation log table for the item ID of the target item to determine whether the operation log of the item includes copying, acquisition, or update. If the operation log includes copying, acquisition, or update, the process advances to step S1410; if it does not include any of them, to step S1421.

In step S1410, the CPU 201 acquires the records of operation logs detected in step S1409. In step S1411, the CPU 201 sets, as a process target, a finally executed operation log (operation whose date & time is the latest) among the acquired operation logs.

In step S1412, the CPU 201 determines whether the target operation log is copying. If the target operation log is copying, the process advances to step S1413; if it is not copying, to step S1417. In step S1413, the CPU 201 determines whether the item table holds a record having an item ID created by the target copy operation log. If the item table holds the record, the process advances to step S1414; if it does not hold the record, to step S1415.

In step S1414, the CPU 201 acquires, from the item table, "delete" and a position where a copy of the item exists. Then, the CPU 201 generates and holds information "delete (copy: <path of copy of item>)" as current position display information. The line "<path of copy of item>)" holds an actual path of the copy of the item, as represented by the display 554 in FIGS. 5A and 5B.

In step S1415, the CPU 201 excludes the target copy operation log from the held logs. In step S1416, the CPU 201 determines whether an acquired operation log still remains. If an acquired operation log still remains, the process returns to step S1411; if no acquired operation log remains, advances to step S1421.

In step S1417, the CPU 201 determines whether the target operation log is update. If the target operation log is update, the process advances to step S1418; if it is not update, to step S1419. In step S1418, the CPU 201 acquires, from the target operation log, "delete" and the name of a user who finally updated the item. As current position display information, the CPU 201 generates and holds information "delete (final update user: <user name>)", as represented by the display 558 in FIGS. 5A and 5B.

In step S1419, the CPU 201 determines whether the target operation log is acquisition. If the target operation log is acquisition, the process advances to step S1420; if it is not acquisition, to step S1421.

In step S1420, the CPU 201 acquires, from the target operation log, "delete" and the name of a user who finally acquired the item. As current position display information, the CPU 201 generates and holds information "delete (final acquirer: <user name>)", as represented by the display 553 in FIGS. 5A and 5B.

In step S1421, the CPU 201 determines whether the target item is a document. If the target item is a document, the process advances to step S1422; if it is not a document, to step S1423. In step S1422, the CPU 201 acquires, from the target operation log, and the name of a user who registered the document serving as the target item. Then, the CPU 201 generates and holds information "delete (registrant: <user name>)" as current position display information. In step S1423, the CPU 201 generates and holds only "delete" as current position display information.

In step S1424, the CPU 201 sets the target item as a processed one. The process returns to step S1402 to target the next unprocessed item.

In step S1425, the CPU 201 generates display information based on the pieces of held information, and sends it to the display unit 212. Then, the process ends.

As described above, according to the embodiment, the past and current arrangement states of a document are displayed in association with each other for comparison. This can reduce the burden on the user to organize documents. In addition, past and current arrangement positions can be easily tracked back from either position, reducing the user load which may arise when arrangement states have not been completely organized.

As for a deleted document, clue information to obtain the document or confirm its contents is displayed. The clue information facilitates checking a deleted document, and reduces the user load to attain the clue information.

Information on a process up to the current display position for a document absent in a past arrangement state is displayed. This information enables the user to easily confirm a document absent in a past arrangement state, and reduces the user load to obtain the information.

In the embodiment, each item holds the ID of a parent item on an upper layer to hold the position of the item. Instead, each item may also hold the IDs of all items between it and an item on the top layer. In this case, the item table holds a large amount of data. However, the user need not track back the path to an item on an upper layer to specify the position of a target item, improving performance.

Next, a modification to the embodiment will be described. As described above, according to the embodiment, when an item present in a past arrangement state was deleted, a finally executed operation among copying, acquisition, and update performed before deletion is displayed as information for displaying a current position in the past arrangement state display area. This information provides a clue to check a document in a state as new as possible. However, when another user has acquired and updated a document, the document needs to be obtained from him for confirmation, and it may be difficult to check the document quickly.

Figure 16A:
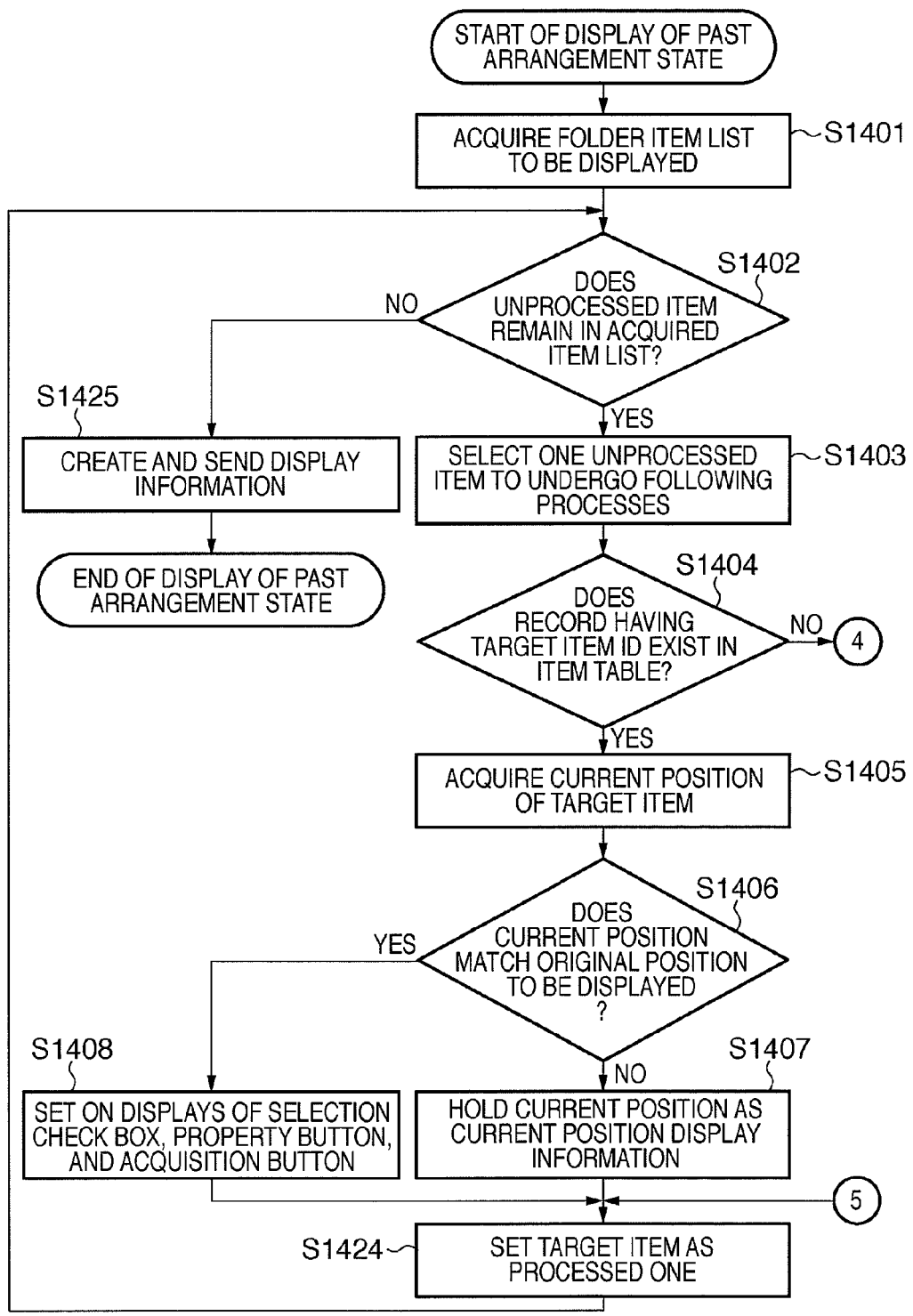
FIGS. 16A and 16B are showing a flowchart illustrating a processing sequence to display a past arrangement state in the folder organization window.
Figure 16B:
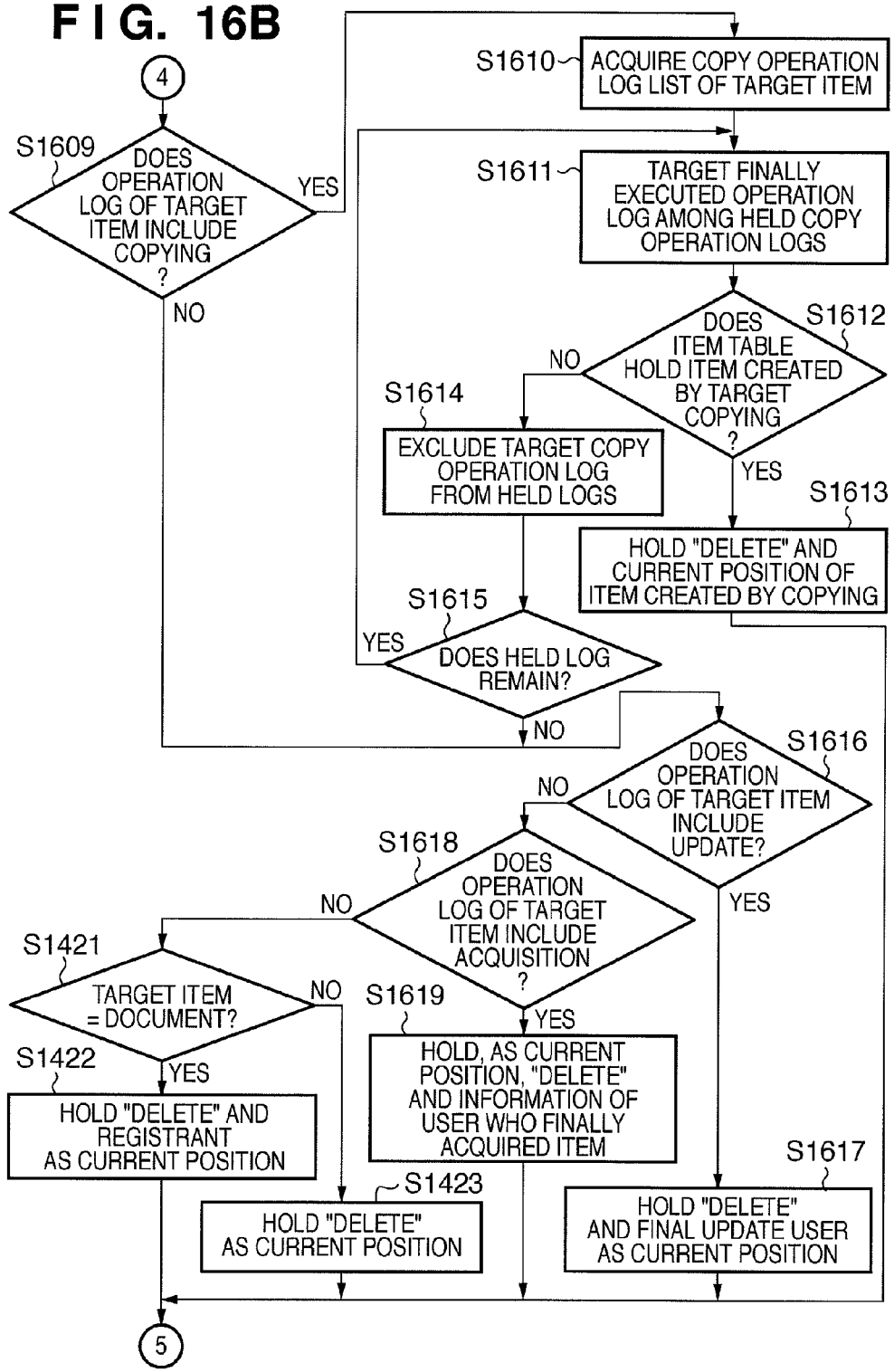

In view of this, according to the modification, if a copy of a document remains in the document management server 101, it is preferentially displayed. FIGS. 16A and 16B shows a processing sequence in the modification. For example, the CPU 201 of the client computer 102 executes the processing shown in FIGS. 16A and 16B.

Figure 14A:
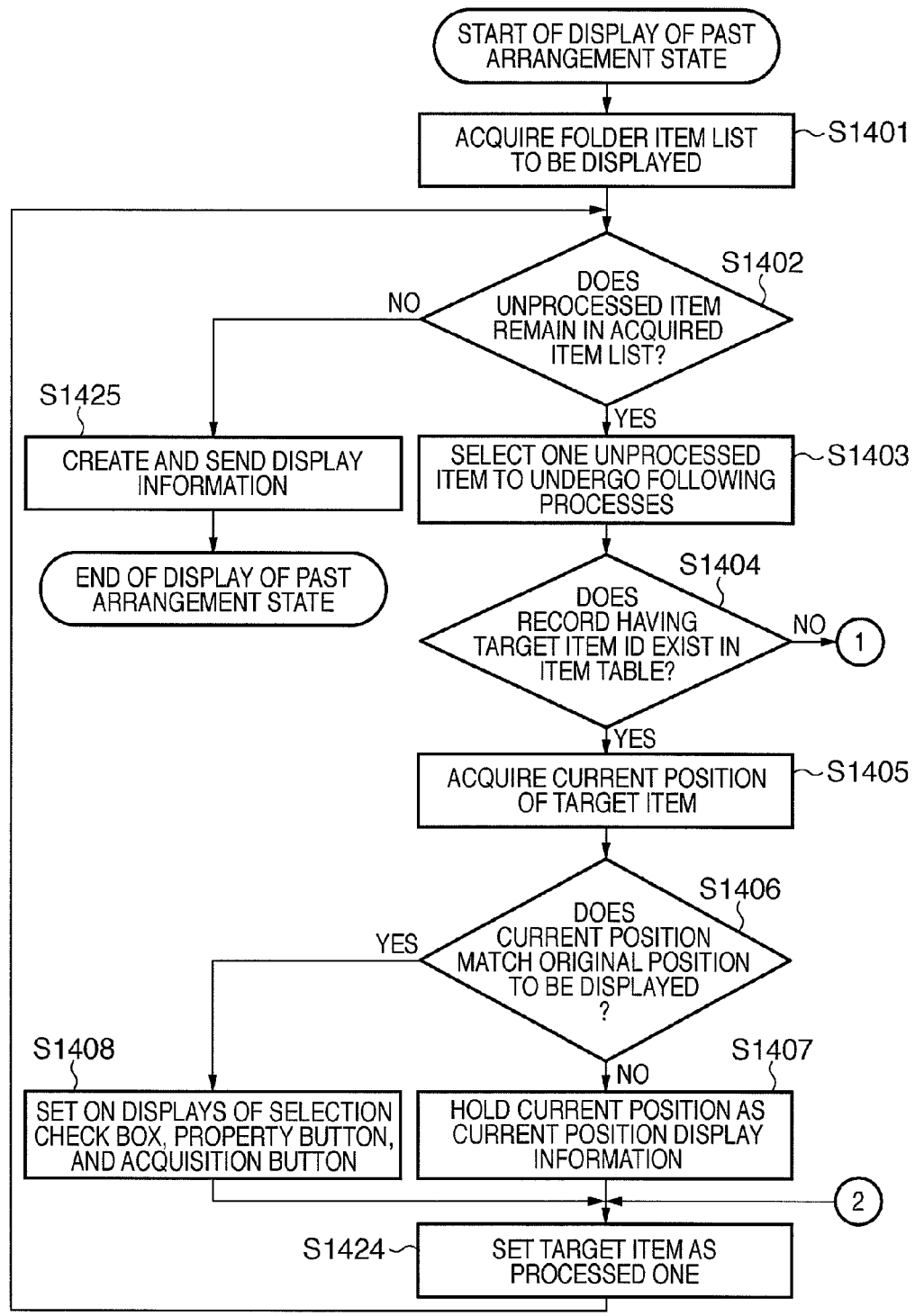

A view shown by FIGS. 16A and 16B is different from FIGS. 14A and 14B in the processes of steps S1609 to S1619. Thus, steps S1609 to S1619 will be explained. In step S1609, the CPU 201 searches the operation log table for the item ID of a target item to determine whether the operation log of the target item includes a copy operation log. If the operation log includes a copy operation log, the process advances to step S1610; if it does not include a copy operation log, to step S1616.

In step S1610, the CPU 201 acquires copy operation logs detected in step S1609. In step S1611, the CPU 201 sets, as a process target, a finally executed operation log among the acquired copy operation logs.

In step S1612, the CPU 201 determines whether the item table holds a record having the item ID of an item created by the target copy operation log. If the item table holds the record, the process advances to step S1613; if it does not hold the record, to step S1614.

In step S1613, the CPU 201 acquires, from the item table, "delete" and a position where a copy of the item exists. Then, the CPU 201 generates and holds information "delete (copy: <path of copy of item>)" as current position display information.

In step S1614, the CPU 201 excludes the target copy operation log from the held logs. In step S1615, the CPU 201 determines whether an acquired copy operation log still remains. If an acquired operation log still remains, the process returns to step S1611; if no acquired operation log remains, advances to step S1616.

In step S1616, the CPU 201 searches the operation log table for the item ID of the target item to determine whether the operation log of the target item includes an update operation log. If the operation log includes an update operation log, the process advances to step S1617; if it does not include an update operation log, to step S1618.

In step S1617, the CPU 201 acquires "delete" and, from a finally executed update operation log, the name of a user who finally updated the item. Then, the CPU 201 generates and holds information "delete (final update user: <user name>)" as current position display information.

In step S1618, the CPU 201 searches the operation log table for the item ID of a target item to determine whether the operation log of the target item includes an acquisition operation log. If the operation log includes an acquisition operation log, the process advances to step S1619; if it does not include an acquisition operation log, to step S1421.

In step S1619, the CPU 201 acquires "delete" and, from a finally executed acquisition operation log, the name of a user who acquired the item. Then, the CPU 201 generates and holds information "delete (final acquirer: <user name>)" as current position display information.

By changing the processing shown in FIGS. 14A and 14B into one shown in FIGS. 16A and 16B, a copy of a document that remains in the document management server 101 can be preferentially presented. When it is difficult to obtain a deleted document from another user for confirmation, a clue to grasp its contents can be easily attained, reducing the burden on the user.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-187912, filed Jul. 18, 2008, which is hereby incorporated by reference herein in its entirety.

What is claimed is:

1. A document management apparatus which manages documents and folders as nodes of a first hierarchical structure, the apparatus comprising:
    a memory for storing first and second tables,
    wherein the first table is configured to hold positions of the nodes of a current hierarchical structure indicating a current arrangement state of the first hierarchical structure, wherein the second table is configured to hold positions of the nodes of a past hierarchical structure indicating a past arrangement state of the first hierarchical structure, and wherein the positions of the nodes of the past hierarchical structure were held at the time of receipt of a predetermined user instruction to hold, and
    a user interface configured to display the nodes of the current hierarchical structure in a first display area based on the positions of the nodes of the current hierarchical structure held by the first table, and to display the nodes of the past hierarchical structure in a second display area based on the positions of the nodes of the past hierarchical structure held by the second table, wherein the nodes of the current hierarchical structure in the first display area and the nodes of the past hierarchical in the second display area are displayed together,
    wherein each of the nodes of the current hierarchical structure in the first display area is displayed with information indicating a corresponding position of the past hierarchical structure, and each of the nodes of the past hierarchical structure in the second display area is displayed with information indicating a corresponding position of the current hierarchical structure.

2. The apparatus according to claim 1, wherein
    when a user designation of the information in the first display area is received, said user interface displays in the second display area, the nodes indicated by the information designated in the first display area, and
    when a user designation of the information in the second display area is received, said user interface displays, in the first display area, the nodes indicated by the information designated in the second display area.

3. The apparatus according to claim 1, wherein the memory further stores a third table configured to hold a log of operations performed for the nodes,
    wherein said user interface displays the nodes of the current hierarchical structure in the first display area in correspondence with the log of the operations held in said third table, and said user interface displays the nodes of the past hierarchical structure in the second display area in correspondence with the log of the operations held in said third table.

4. The apparatus according to claim 3, wherein
the operations held in said third table include at least one of deletion, registration, acquisition, update, and copying for a node, and
the log of the operations includes at least one of the operation, a date when the operation was performed, and a layer in which the operation has been undergone.

5. The apparatus according to claim 3, wherein said user interface displays the nodes in correspondence with a latest operation in the log of the operations held in said third table.

6. The apparatus according to claim 3, wherein said user interface preferentially displays the nodes of the past hierarchical structure in the second display area in correspondence with copy and delete operations when the copy and delete operations are included in the log of the operations held in said third table.

7. A document management method executed in a document management apparatus which manages documents and folders as nodes of a first hierarchical structure, the method comprising:
 a first holding step of holding positions of the nodes of a current hierarchical structure indicating a current arrangement state of the first hierarchical structure;
 a second holding step of holding positions of the nodes of a past hierarchical structure indicating a past arrangement state of the first hierarchical structure, wherein the positions of the nodes of the past hierarchical structure were held at the time of receipt of a predetermined user instruction to hold; and
 a display step of displaying a user interface configured to display the nodes of the current hierarchical structure in a first display area based on the positions of the nodes of the current hierarchical structure held in the first holding step, and to display the nodes of the past hierarchical structure in a second display area based on the positions of the nodes of the past hierarchical structure held in the second holding step, wherein the nodes of the current hierarchical structure in the first display area and the nodes of the past hierarchical in the second display area are displayed together,
wherein each of the nodes of the current hierarchical structure in the first display area is displayed with information indicating a corresponding position of the past hierarchical structure, and each of the nodes of the past hierarchical structure in the second display area is displayed with information indicating a corresponding position of the current hierarchical structure.

8. A non-transitory computer-readable storage medium retrievably storing a document management program for managing documents and folders as nodes of a first hierarchical structure, the program causing a computer to perform a method comprising:
 a first holding step of holding positions of the nodes of a current hierarchical structure indicating a current arrangement state of the first hierarchical structure;
 a second holding step of holding positions of the nodes of a past hierarchical structure indicating a past arrangement state of the first hierarchical structure, wherein the positions of the nodes of the past hierarchical structure were held at the time of receipt of a predetermined user instruction to hold; and
 a display step of displaying a user interface configured to display the nodes of the current hierarchical structure in a first display area based on the positions of the nodes of the current hierarchical structure held in the first holding step, and to display the nodes of the past hierarchical structure in a second display area based on the positions of the nodes of the past hierarchical structure held in the second holding step, wherein the nodes of the current hierarchical structure in the first display area and the nodes of the past hierarchical in the second display area are displayed together,
wherein each of the nodes of the current hierarchical structure in the first display area is displayed with information indicating a corresponding position of the past hierarchical structure, and each of the nodes of the past hierarchical structure in the second display area is displayed with information indicating a corresponding position of the current hierarchical structure.

\* \* \* \* \*